(12) United States Patent
Chen et al.

(10) Patent No.: US 12,288,856 B2
(45) Date of Patent: Apr. 29, 2025

(54) DEVICE AND METHOD FOR HEATING A BATTERY

(71) Applicant: CONTEMPORARY AMPEREX TECHNOLOGY (HONG KONG) LIMITED, Hong Kong (CN)

(72) Inventors: Wei Chen, Ningde (CN); Yuanmiao Zhao, Ningde (CN); Xianxi Pan, Ningde (CN); Xiaojian Huang, Ningde (CN); Yu Yan, Ningde (CN); Zhimin Dan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/625,899

(22) Filed: Apr. 3, 2024

(65) Prior Publication Data

US 2024/0250332 A1 Jul. 25, 2024

Related U.S. Application Data

(63) Continuation of application No. PCT/CN2022/088411, filed on Apr. 22, 2022.

(51) Int. Cl.
*H02J 7/00* (2006.01)
*H01M 10/42* (2006.01)
(Continued)

(52) U.S. Cl.
CPC ....... *H01M 10/63* (2015.04); *H01M 10/4264* (2013.01); *H01M 10/443* (2013.01);
(Continued)

(58) Field of Classification Search
CPC .......... B60L 55/00; B60L 53/30; B60L 53/31; B60L 53/34; B60L 53/305; B60L 53/20;
(Continued)

(56) References Cited

U.S. PATENT DOCUMENTS

| 11,728,732 B2 * | 8/2023 | Prasad | H02M 3/158 |
| | | | 323/271 |
| 2008/0002322 A1 * | 1/2008 | Hirasawa | B60L 3/0046 |
| | | | 361/79 |

(Continued)

FOREIGN PATENT DOCUMENTS

| CN | 101238018 A | 8/2008 |
| CN | 110224651 A | 9/2019 |

(Continued)

OTHER PUBLICATIONS

International Search Report for PCT application No. PCT/CN2022/088411, dated Jan. 18, 2023.

(Continued)

*Primary Examiner* — Alexis B Pacheco
(74) *Attorney, Agent, or Firm* — Ladas & Parry, LLP (57) ABSTRACT

A device and method for heating a battery are provided. The device is provided on a first power-consuming device and includes: a first interface electrically coupled to a neutral point of a motor winding of the first power-consuming device; a second interface electrically coupled to a negative electrode of a battery of the first power-consuming device; and a control module coupled to a control system of the first power-consuming device and a control system of a second power-consuming device to coordinate and control the first power-consuming device and the second power-consuming device. The first interface is engageable with a third interface electrically coupled to a neutral point of a motor winding of the second power-consuming device. The second interface is engageable with a fourth interface electrically coupled to a negative electrode of a battery of the second power-consuming device. The control module is configured to perform a battery heating step.

14 Claims, 3 Drawing Sheets

(51) Int. Cl.
*H01M 10/44* (2006.01)
*H01M 10/615* (2014.01)
*H01M 10/63* (2014.01)
*H02J 7/14* (2006.01)

(52) U.S. Cl.
CPC ......... *H01M 10/615* (2015.04); *H02J 7/0042* (2013.01); *H02J 7/0047* (2013.01); *H02J 7/0063* (2013.01); *H02J 7/007194* (2020.01)

(58) Field of Classification Search
CPC .......... B60L 53/24; B60L 53/16; B60L 53/14; B60L 53/18; B60L 53/10; H02J 7/342
USPC .................................................. 320/109, 134
See application file for complete search history.

(56) References Cited

U.S. PATENT DOCUMENTS

| | | | |
|---|---|---|---|
| 2009/0033252 A1 | 2/2009 | Smith et al. | |
| 2009/0033274 A1 | 2/2009 | Perisic et al. | |
| 2014/0139182 A1* | 5/2014 | Ichikawa | B60L 53/18 320/109 |
| 2019/0001833 A1* | 1/2019 | Coburn | B60L 53/66 |
| 2019/0165591 A1* | 5/2019 | Kisacikoglu | B60L 53/20 |
| 2019/0229382 A1* | 7/2019 | Machida | H02J 7/0069 |
| 2021/0008994 A1* | 1/2021 | Choi | H04W 4/46 |
| 2021/0061118 A1* | 3/2021 | Lee | H02J 7/0047 |
| 2021/0061128 A1 | 3/2021 | Lee et al. | |
| 2021/0249707 A1 | 8/2021 | Zuo et al. | |
| 2021/0380005 A1* | 12/2021 | Bin | B60L 15/007 |
| 2022/0097540 A1* | 3/2022 | Atluri | H02J 7/0048 |
| 2022/0274498 A1* | 9/2022 | Huang | B60L 53/53 |
| 2022/0297557 A1* | 9/2022 | Prasad | H02M 3/1586 |
| 2022/0402390 A1* | 12/2022 | Smolenaers | H02J 3/322 |

FOREIGN PATENT DOCUMENTS

| | | |
|---|---|---|
| CN | 111391719 A | 7/2020 |
| CN | 111660875 A | 9/2020 |
| CN | 113022344 A | 6/2021 |
| CN | 113085516 A | 7/2021 |
| JP | 2008167619 A | 7/2008 |
| JP | 2008195214 A | 8/2008 |
| JP | 2010022141 A | 1/2010 |
| JP | 2014017987 A | 1/2014 |
| JP | 2014226000 A | 12/2014 |
| JP | 2016005371 A | 1/2016 |
| JP | 2016181948 A | 10/2016 |
| JP | 2021013226 A | 2/2021 |
| JP | 2021044949 A | 3/2021 |
| JP | 2021180551 A | 11/2021 |
| JP | 2022550333 A | 12/2022 |
| JP | 2022550335 A | 12/2022 |

OTHER PUBLICATIONS

Written Opinion of International Searching Authority for PCT application No. PCT/CN2022/088411, dated Jan. 18, 2023.
The First Office Action from counterpart application No. KR10-2024-7008671 issued on Jul. 3, 2024 from the KIPO.
The Grant Notice from counterpart application No. KR10-2024-7008671 issued on Aug. 26, 2024 from the KIPO.
The Grant Notice from counterpart application No. JP2024-518941 issued on Aug. 6, 2024 from the JPO.
Extended European Search Report from corresponding European Patent Application No. 22937923.5 dated Jan. 2, 2025.

* cited by examiner

FIG. 3

DEVICE AND METHOD FOR HEATING A BATTERY

CROSS REFERENCE TO RELATED APPLICATION

This application is a continuation of International Patent Application No. PCT/CN2022/088411, filed on Apr. 22, 2022, which is incorporated by reference in its entirety.

TECHNICAL FIELD

The present disclosure relates to the technical field of batteries, and in particular, to a device and method for heating a battery.

BACKGROUND

Due to its advantages like high energy density, rechargeability, safety, and environmental friendliness, a battery is widely applied in the fields of vehicles, consumer electronics, and energy storage systems.

SUMMARY

The present disclosure provides a device and method for heating a battery, capable of solving a self-heating problem of the battery at a low temperature by means of charging and discharging of the battery.

According to a first aspect of the present disclosure, a device for heating a battery is provided. The device is provided on a first power-consuming device and includes: a first interface electrically coupled to a neutral point of a motor winding of the first power-consuming device; a second interface electrically coupled to a negative electrode of a battery of the first power-consuming device; and a control module coupled to a control system of the first power-consuming device and a control system of a second power-consuming device to coordinate and control the first power-consuming device and the second power-consuming device. The first interface is engageable with a third interface electrically coupled to a neutral point of a motor winding of the second power-consuming device; the second interface is engageable with a fourth interface electrically coupled to a negative electrode of a battery of the second power-consuming device; and the control module is configured to perform a battery heating step.

According to a second aspect of the present disclosure, a device for heating a battery is provided. The device is provided on a charging pile and includes: a first switch coupled in series between a first charging gun and a second charging gun of the charging pile, wherein the first charging gun is engageable with a first charging socket of a first power-consuming device, the first charging socket is electrically coupled to a neutral point of a motor winding of the first power-consuming device, the second charging gun is engageable with a second charging socket of a second power-consuming device, and the second charging socket is electrically coupled to a neutral point of a motor winding of the second power-consuming device; and a control module coupled to a control system of the first power-consuming device and a control system of the second power-consuming device, to coordinate and control the first power-consuming device, the second power-consuming device, and the charging pile. The first switch is configured to be closed to electrically couple the neutral point of the motor winding of the first power-consuming device to the neutral point of the second power-consuming device electrically coupled to the motor winding of the second power-consuming device; and the control module is configured to perform a battery heating step.

According to a third aspect of the present disclosure, a method for heating a battery is provided. The method is performed at a power-consuming device or a charging pile and includes: engaging a first interface electrically coupled to a negative electrode of a battery of a first power-consuming device with a third interface electrically coupled to a negative electrode of a battery of a second power-consuming device; engaging a second interface electrically coupled to a neutral point of a motor winding of the first power-consuming device with a fourth interface electrically coupled to a neutral point of a motor winding of the second power-consuming device; and performing a battery heating step.

BRIEF DESCRIPTION OF THE DRAWINGS

In order to more clearly illustrate the technical solutions of embodiments of the present disclosure, the drawings which are required to be used in the embodiments of the present disclosure will be briefly described below. It is apparent that the drawings described below are some embodiments of the present disclosure, and those of ordinary skill in the art may be obtain other drawings based on the accompanying drawings without inventive effort.

In the drawings, the figures are not drawn to scale.

DETAILED DESCRIPTION

Implementations of the present disclosure are described in further detail below with reference to the accompanying drawings and embodiments. The following detailed description of the embodiments and the accompanying drawings are provided to illustrate the principles of the present disclosure and are not intended to limit the scope of the present disclosure, i.e., the present disclosure is not limited to the embodiments described.

In the description of the present disclosure, it should be noted that, unless otherwise specified, "a plurality of" means two or more; orientations or position relationships indicted by terms such as "upper", "lower", "left", "right", "in", "out", is only for the convenience of describing the present disclosure and simplifying the description, rather than indicating or implying that the associated device or element must have a specific orientation, or be constructed and operated in a specific orientation, and therefore cannot be understood as a limitation to the present disclosure. Furthermore, the terms "first", "second", "third", and the like are used for descriptive purposes only and are not to be construed as indicating or implying relative importance.

In the description of the present disclosure, it should be noted that when a component is referred to as "connected", "coupled", or "engaged" to another component, it may be directly connected, coupled, or engaged to another component, or indirectly connected, coupled, or engaged through intervening components. Conversely, when a component is referred to as "directly connected", "directly coupled", or "directly engaged" to another component, intervening components may not occur. Other terms used to describe the relationship between elements (such as "between" and "directly between") should be interpreted in a similar manner.

Singular forms "a", "an", and "the", unless expressly specified and limited otherwise, are intended to include plural forms as well. It should be further understood that the terms "comprise", "include", "contain", and/or "have", when used herein, specify the presence of stated features, operations, elements, and/or components, but do not exclude the presence or addition of one or more other features, operations, elements, components, and/or their combinations.

A battery generally needs to operate within an appropriate operating temperature range. A low-temperature environment may cause adverse effects on normal use of the battery. For example, a battery capacity is severely degraded and is unable to perform normal charging and discharging under a low-temperature environment. Therefore, for proper functioning of the battery, it is necessary to heat the battery in a low-temperature environment.

Some electrical systems of a power-consuming device (e.g., an electric vehicle), further include, besides the battery, devices, such as a motor, that utilize electric energy stored in the battery and control devices, such as a power converter, that supply power to the motor from the battery. Therefore, in a case where the battery in the power-consuming device needs to be heated on the basis of original components of the power-consuming device, it is necessary to avoid excessive modification or damage to the original components. For example, in a case of using a multi-phase system (such as using a three-phase motor and a three-phase power converter) in the power-consuming device, in the related art for battery heating, the motor in the power-consuming device is controlled to operate at a 0-torque for heating the battery, which has a low heating rate. Moreover, it is possible to cause vibration and noise problems in the motor due to imbalances between phases of the motor. Therefore, these problems may potentially lead to mechanical and electrical damage.

Therefore, in a process of heating the battery, balances between the phases should be considered, to avoid the vibration and noise problems in the motor because of the imbalances between phases, and to avoid mechanical and electrical damage to the motor.

Based on the above considerations, the inventors propose a system and method for heating the battery. A neutral point of multi-phase winding of the motor of the power-consuming device is extracted, enabling the multi-phase winding of the motor to be equivalent parallel, thereby improving a current flowing through the battery of the power-consuming device to achieve rapid heating. Moreover, a multi-phase balance of the power-consuming device during battery heating is ensured. In addition, the neutral points of multi-phase windings of motors of a plurality of power-consuming devices are engaged, so that the batteries of the power-consuming devices may be charged and discharged to each other, thus enhancing heating efficiency.

The power-consuming device in the embodiments of the present disclosure may be a battery electric vehicle, a hybrid electric vehicle, a storage battery car, etc., but is not limited thereto. The power-consuming device in the embodiments of the present disclosure may be any power-consuming device that includes a multi-phase motor and is powered by the battery.

An application scenario of the device and method according to the present disclosure may include a rescue vehicle providing assistance to one or more vehicles that may not start due to the battery at the low temperature, the charging pile allowing two or more vehicles that are connected to the charging pile to realize among the vehicles being charged after rapid being heated at a low temperature, and the like.

Figure 1:
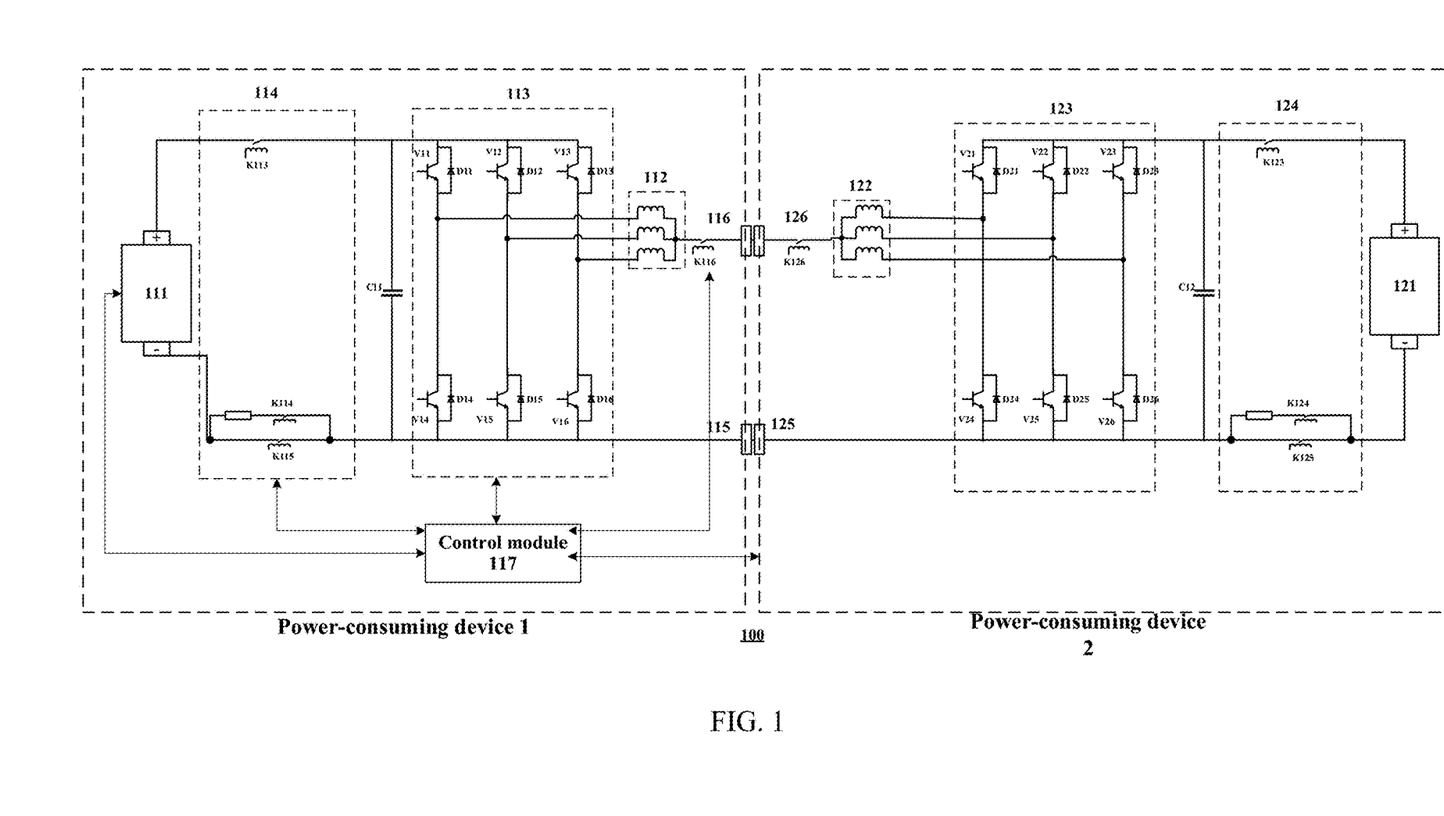
FIG. 1 is a schematic structural diagram of at least a part of a system for heating a battery according to an embodiment of the present disclosure.

FIG. 1 is a schematic structural diagram of at least a part of a system 100 for heating a battery according to an embodiment of the present disclosure. The system 100 is suitable for directly heating the battery between two power-consuming devices. As illustrated in FIG. 1, the system 100 includes a power-consuming device 1 and a power-consuming device 2. As a non-limiting example, the power-consuming device 1 may be a rescue vehicle, and the power-consuming device 2 may be a rescued vehicle requiring battery heating due to the low temperature. The power-consuming device 1 includes a battery 111, a motor 112, and a three-phase power converter 113 coupled between the battery 111 and the motor 112. The power-consuming device 2 includes a battery 121, a motor 122, and a three-phase power converter 123 coupled between the battery 121 and the motor 122. The motor 112 and the motor 122 illustrated in FIG. 1 are three-phase motors having a three-phase winding. However, it should be understood that the embodiments of the present disclosure are not limited thereto. The motors 112 and 122 may be a three-phase motor, a six-phase motor, a nine-phase motor, or the like. Correspondingly, a motor winding of the motor 112 and a motor winding of the motor 122 each have a three-phase inductor, a six-phase inductor, a nine-phase inductor, or the like. A topology of the three-phase power converter 113 and a topology of the three-phase power converter 123 illustrated in FIG. 1 each are a topology of a conventional AC/DC converter and include three bridge arms coupled in parallel respectively for three phases. Each of the three bridge arms includes an upper bridge arm switch and a lower bridge arm switch that are coupled in series.

As an example, the three-phase power converter 113 in FIG. 1 includes an upper bridge arm switch V11 and a lower bridge arm switch V14 of a first phase, an upper bridge arm switch V12 and a lower bridge arm switch V15 of a second phase, and an upper bridge arm switch V13 and a lower bridge arm switch V16 of a third phase. Moreover, the three-phase power converter 113 includes a freewheeling diode D11 coupled in parallel with the switch V11, a freewheeling diode D12 coupled in parallel with the switch V12, a freewheeling diode D13 coupled in parallel with the switch V13, a freewheeling diode D14 coupled in parallel with the switch V14, a freewheeling diode D15 coupled in parallel with the switch V15, and a freewheeling diode D16 coupled in parallel with the switch V16. However, it should be understood that other converter topologies may be used. The switches may use one or more of power switch devices such as a Metal-Oxide Semiconductor Field-Effect Transistor (MOSFET), an Insulated Gate Bipolar Transistor (IGBT), or the like.

As illustrated in FIG. 1, the system 100 may include an interface 116 of the power-consuming device 1 electrically coupled to a neutral point of a winding of the motor 112 and an interface 115 of the power-consuming device 1 electrically coupled to a negative electrode of a battery 111, and an interface 126 of the power-consuming device 2 electrically coupled to a neutral point of a winding of a motor 122 and an interface 125 of the power-consuming device 2 electrically coupled to a negative electrode of a battery 121. The interface 116 may be engaged with the interface 126, and the interface 115 may be engaged with the interface 125, to electrically couple the power-consuming device 1 with the power-consuming device 2. In addition, the system 100 may further include a control module 117 provided in the power-consuming device 1. The control module 117 is coupled to a control system of the power-consuming device 1 and a control system of the power-consuming device 2, and is configured to coordinate and control a power converter and other switches in the power-consuming device 1 and a power converter and other switches in the power-consuming device 2. Although not illustrated, similarly, the control module may also be provided in the power-consuming device 2.

In the embodiments according to the present disclosure, the system 100 may include a switch K116 coupled in series between the neutral point of the winding of the motor 112 and the interface 116. In addition, the system 100 may include a switch K126 coupled in series between the neutral point of the winding of the motor 122 and the interface 126.

In the embodiments according to the present disclosure, the power-consuming device 1 may include a pre-charge circuit 114 coupled between the battery 111 and the power converter 113. The pre-charge circuit 114 includes a switch K113 coupled in series between a positive electrode of the battery 111 and a positive terminal of a capacitor C11 coupled in parallel with an input terminal of the power converter 113, a switch K115 coupled in series between a negative electrode of the battery 111 and a negative terminal of the capacitor C11, and a switch K114 that is coupled in series to a resistor and is coupled in parallel to both terminals of the K115 with the resistor. Similarly, the power-consuming device 2 may include a pre-charge circuit 124 coupled between the battery 121 and the power converter 123. The pre-charge circuit 124 includes a switch K123 coupled in series between a positive electrode of the battery 121 and a positive terminal of a capacitor C12 coupled in parallel with an input terminal of the power converter 123, a switch K125 coupled in series between a negative electrode of the battery 121 and a negative terminal of the capacitor C12, and a switch K124 that is coupled in series to the resistor and is coupled in parallel to both terminals of the K125 with the resistor. It should be understood that, in the embodiments of the present disclosure, referring to FIG. 2, alternatively, the K113 may be coupled in series between the negative electrode of the battery 111 and the negative terminal of the capacitor C11, the K115 may be coupled in series between the positive electrode of the battery 111 and the positive terminal of the capacitor C11, the K123 may be coupled in series between the negative electrode of the battery 121 and the negative terminal of the capacitor C12, and the K125 may be coupled in series between the positive electrode of the battery 121 and the positive terminal of the capacitor C12.

Figure 2:
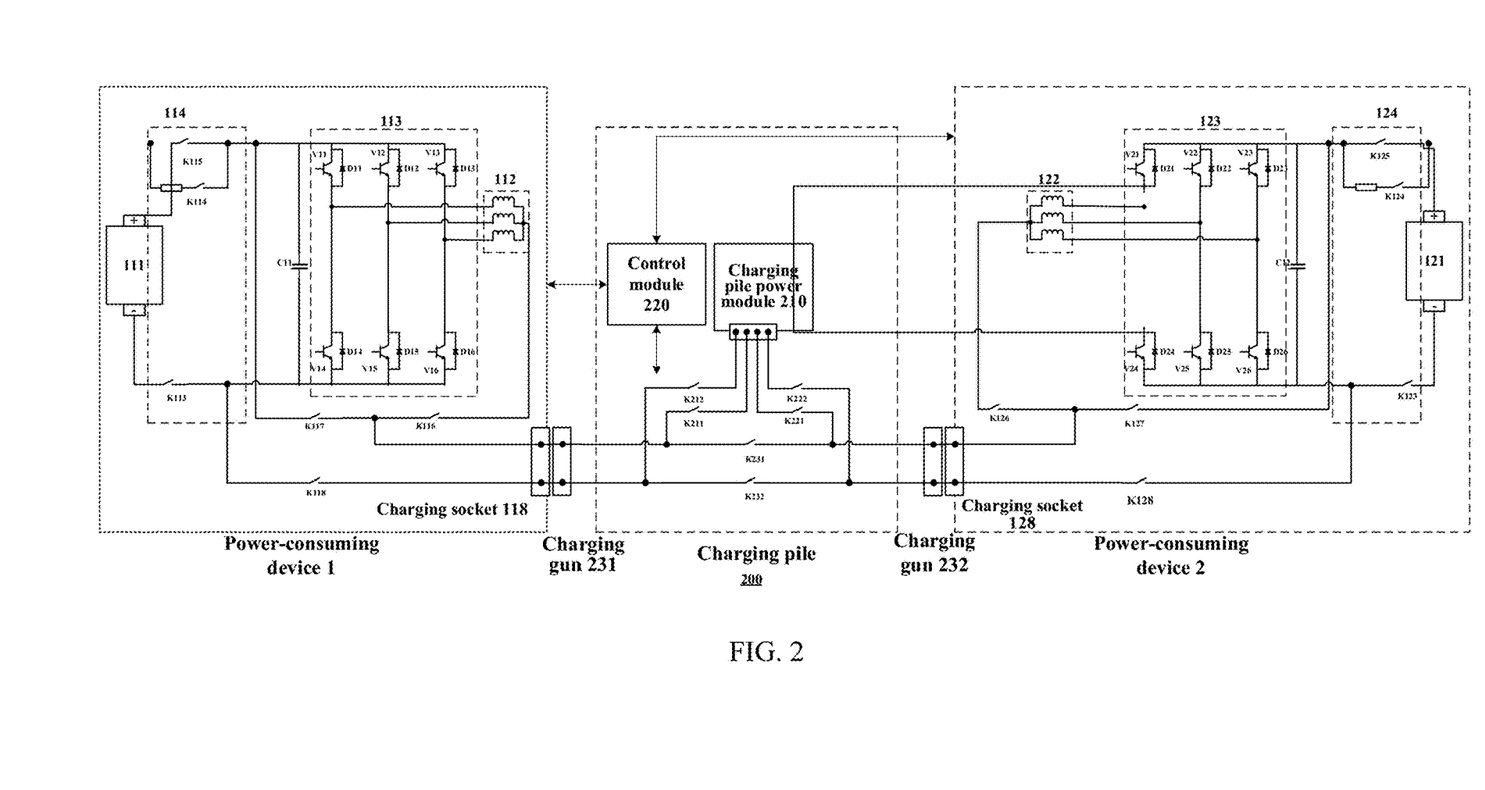
FIG. 2 is a schematic structural diagram of a system for heating a battery according to an embodiment of the present disclosure.

FIG. 2 is a schematic structural diagram of a system 200 for heating a battery according to an embodiment of the present disclosure. The system 200 is suitable for a case where the battery is heated by the charging pile between the two power-consuming devices. Components similar to FIG. 1 in a structure of FIG. 2 are not described in detail herein.

As illustrated in FIG. 2, the system 200 may include a control module 220 provided in the charging pile. The control module 220 is coupled to the control system of the power-consuming device 1 and the control system of the power-consuming device 2, and is configured to coordinate and control the power converter and other switches in the power-consuming device 1, the power converter and other switches in the power-consuming device 2, and the charging pile.

In lieu of the interface illustrated in FIG. 1 for electrical coupling between the power-consuming devices, the power-consuming device 1 may include a charging socket 118 engaged with a charging gun 231 of the charging pile, and the power-consuming device 2 may include a charging socket 128 engaged with a charging gun 232 of the charging pile. The system 200 may include a switch K231 coupled in series between the charging gun 231 and the charging gun 232. In some embodiments, the switch K231 is coupled in series between a positive terminal of the charging gun 231 and a positive terminal of the charging gun 232. In the embodiments according to the present disclosure, the system 200 may further include a switch K232 coupled between the charging gun 231 and the charging gun 232. In a further embodiment, the switch K232 is coupled in series between a negative terminal of the charging gun 231 and a negative terminal of the charging gun 232.

In the embodiments according to the present disclosure, the system 200 may further include a switch K211 and a switch K212 that are coupled in series between the charging gun 231 of the charging pile and a power module 210. The K211 is coupled in series between the positive terminal of the charging gun 231 and one positive terminal of the power module 210, and the K212 is coupled in series between the negative terminal of the charging gun 231 and one negative terminal of the power module 210. In the embodiments according to the present disclosure, the system 200 may further include a switch K221 and a switch K222 that are coupled in series between the charging gun 232 of the charging pile and the power module 210. The K221 is coupled in series between the positive terminal of the charging gun 232 and another positive terminal of the power module 210, and the K222 is coupled in series between the negative terminal of the charging gun 232 and another negative terminal of the power module 210. It should be understood that the system 200 may include one or more of the switches K211, K212, K221, and K222, rather than all of them.

In the embodiments according to the present disclosure, the power-consuming device 1 may further include a switch K117 and a switch K118 that couple the battery 111 in parallel to the charging socket 118. The K117 is coupled in series between the positive terminal of the capacitor C1 and a positive terminal of the charging socket 118, and the K118 is coupled in series between the negative terminal of the capacitor C1 and a negative terminal of the charging socket 118. Similarly, the power-consuming device 2 may further include a switch K127 and a switch K128 that couple the battery 121 in parallel to the charging socket 128. The K127 is coupled in series between the positive terminal of the capacitor C1 and the positive terminal of the charging socket 118, and the K128 is coupled in series between the negative terminal of the capacitor C1 and the negative terminal of the charging socket 118. It should be understood that one or more of the switches K117, K118, K127, and K128, rather than all of them, may be included.

Figure 3:
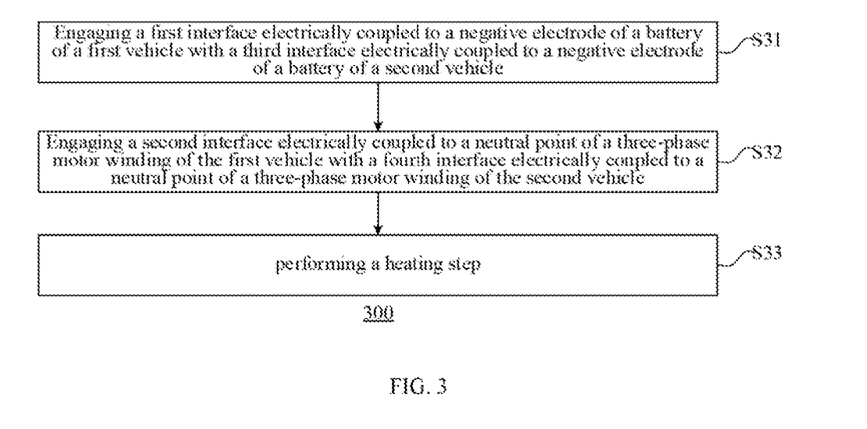
FIG. 3 is a flowchart of a method for heating a battery according to an embodiment of the present disclosure.

FIG. 3 is a flowchart of a method 300 for heating a battery according to an embodiment of the present disclosure. The method 300 may be performed at the power-consuming device (in the system 100 as illustrated in FIG. 1) or at the charging pile (in the system 200 as illustrated in FIG. 2).

As illustrated in FIG. 3, at step S31, a first interface electrically coupled to a negative electrode of a battery of a first power-consuming device may be engaged with a third interface electrically coupled to a negative electrode of a battery of a second power-consuming device; at step S32, a second interface electrically coupled to a neutral point of a motor winding of the first power-consuming device may be engaged with a fourth interface electrically coupled to a neutral point of a motor winding of the second power-consuming device; and at step S33, a battery heating step may be performed to heat the battery of the first charging device and/or the battery the second charging device. It should be understood that step S31 and step S32 may be performed in the illustrated order, in parallel, or in a reverse order as illustrated.

In the embodiments according to the present disclosure, the battery heating step may include charging the battery of the second power-consuming device by using the battery of the first power-consuming device. In some embodiments, the operation of charging the battery of the second power-consuming device by using the battery of the first power-consuming device includes: closing a switch of an upper bridge arm of a three-phase power converter of the first power-consuming device and disconnecting a switch of a lower bridge arm of the three-phase power converter of the first power-consuming device, and disconnecting a switch of an upper bridge arm of a three-phase power converter of the second power-consuming device and closing a switch of a lower bridge arm of the three-phase power converter of the second power-consuming device, to perform inductive charging on the motor winding of the first power-consuming device and the motor winding of the second power-consuming device by using electricity discharged from the battery of the first power-consuming device; and closing the switch of the upper bridge arm of the three-phase power converter of the second power-consuming device and disconnecting the switch of the lower bridge arm of the three-phase power converter of the second power-consuming device, to charge the battery of the second power-consuming device subsequent to the inductive charging.

In the embodiments according to the present disclosure, the battery heating step may further include charging the battery of the first power-consuming device by using the battery of the second power-consuming device. In some embodiments, the operation of charging the battery of the first power-consuming device by using the battery of the second power-consuming device includes: disconnecting a switch of an upper bridge arm of a three-phase power converter of the first power-consuming device and closing a switch of a lower bridge arm of the three-phase power converter of the first power-consuming device, and closing a switch of an upper bridge arm of a three-phase power converter of the second power-consuming device and disconnecting a switch of a lower bridge arm of the three-phase power converter of the second power-consuming device, to perform inductive charging on the motor winding of the first power-consuming device and the motor winding of the second power-consuming device by using electricity discharged from the battery of the second power-consuming device; and closing the switch of the upper bridge arm of the three-phase power converter of the first power-consuming device and disconnecting the switch of the lower bridge arm of the three-phase power converter of the first power-consuming device, to charge the battery of the first power-consuming device subsequent to the inductive charging.

In the embodiments according to the present disclosure, before performing the battery heating step, a pre-charging step may be performed by using the pre-charge circuit and the control module.

In the embodiments according to the present disclosure, before performing the battery heating step, a parameter of the battery of at least one of the first power-consuming device and the second power-consuming device may further be obtained, and it is determined that whether the parameter satisfies a self-heating condition. A first switch coupled in series between the neutral point of the first power-consuming device and the first interface and a second switch coupled in series between the neutral point of the second power-consuming device and the third interface are closed in response to the parameter satisfying the self-heating condition.

In the embodiments according to the present disclosure, a temperature of the battery of the at least one of the first power-consuming device and the second power-consuming device may further be obtained, and it is determined that whether the temperature satisfies a predetermined condition. In response to the temperature not satisfying the predetermined condition, at least one of the step of charging the battery of the second power-consuming device by using the battery of the first power-consuming device and the step of charging the battery of the first power-consuming device by using the battery of the second power-consuming device is performed repetitively until the temperature satisfies the predetermined condition.

A method for directly heating a battery between the two power-consuming devices is described below in combination with FIG. 1.

At step 1: A power-consuming device 1 and a power-consuming device 2 may be engaged with each other through an interface 115 and an interface 125, and an interface 116 and an interface 126. After the engagement, the power-consuming device 1 as a rescue vehicle may obtain a parameter of a battery 121 of the power-consuming device 2 as a rescued vehicle. The parameter includes, but is not limited to, one or more of a temperature of a battery pack, a state of charge (SOC), a voltage signal, or the like.

At step 2: A control module 117 may determine, based on the parameter of the battery 121, whether a self-heating condition is satisfied. As a non-limiting example, the self-heating condition may include whether a temperature of a battery pack is lower than a predetermined temperature, whether a SOC is higher than a predetermined SOC, whether a voltage amplitude is higher than a predetermined voltage amplitude, or the like. In response to the parameter satisfying the self-heating condition, a self-heating mode may be started, and information of the two power-consuming devices may be interacted. As illustrated in FIG. 1, a switch K116 and a switch K126 may be closed under the control of the control module 117. When the parameter doesn't satisfy the self-heating condition, no subsequent operation is performed. In the embodiments of the present disclosure, the same determination may also be performed on the battery 111 of the power-consuming device 1 serving as the rescue vehicle. In a case where a parameter of at least one of the battery 111 and the battery 121 satisfies the self-heating condition, the self-heating mode is started. In this way, it is possible to ensure that the rescue vehicle has a rescue capability and the rescued vehicle has a necessity to be rescued before the battery heating step is performed.

At step 3: Before the battery heating step, a capacitor C11 connected in parallel to an input terminal of a three-phase power converter 113 may be pre-charged based on a pre-charge circuit 114. As illustrated in FIG. 1, a switch K113 and a switch K114 may be closed under the control of the control module 117, so that the capacitor C11 is pre-charged by using the battery 111. Moreover, after the pre-charging is completed, a switch K115 may be closed, and the switch K114 is then disconnected. In the embodiments of the present disclosure, similarly, the battery 121 may be used to pre-charge a capacitor C12 connected in parallel to an input terminal of a three-phase power converter 123 based on a pre-charge circuit 124. As illustrated in FIG. 1, a switch K123 and a switch K124 may be closed under the control of the control module 117, so that the capacitor C12 is pre-charged by using the battery 121. Moreover, after pre-charging is completed, a switch K125 may be closed, and the switch K124 is then disconnected. In this way, a DC bus capacitor of the three-phase power converter may operate normally, thereby facilitating performing the battery heating step.

At step 4: An inductor of a motor 112 and an inductor of a motor 122 may be charged by using electricity discharged from the battery 111. In some embodiments, under the control of the control module 117, switches V11, V12, and V13 of teh upper bridge arms of the three-phase power converter 113 may be closed, and switches V14, V15, and V16 of the lower bridge arms of the three-phase power converter 113 may be disconnected; and switches V21, V22, and V23 of the upper bridge arms of the three-phase power converter 123 may be disconnected, and switches V24, V25, and V26 of the lower bridge arms of the three-phase power converter 123 may be closed, to perform inductive charging on a winding of the motor 112 and a winding of the motor 122 by using electricity discharged from the battery 111. In this case, a current path is: a positive electrode of the battery 111→the upper bridge arms V11, V12, and V13 of the three-phase power converter 113→pan inductor of the winding of the motor 112→pan inductor of the winding of the motor 122→the lower bridge arms V24, V25, and V26 of the three-phase power converter 123→a negative electrode of the battery 111.

In the present disclosure, the closing and disconnection of the switches V11 to V16 of the three-phase power converter 113 and the closing and disconnection of the switches V21 to V26 of the three-phase power converter 123 may be implemented by control signals applied at control terminals (such as the gate of MOSFET and IGBT) of the switches. In the control of a conventional AC/DC three-phase power converter, a phase difference between control signals of switches of all phases occurs to ensure normal operation of a motor coupled thereto. However, a control without the phase difference is performed in the present disclosure. In some embodiments, in the three-phase power converter 113, there is no phase difference between control signals of the upper bridge arm switches V11, V12, and V13 respectively belonging to three phases, enabling the three switches V11, V12, and V13 to be closed or disconnected simultaneously, and moreover, there is no phase difference between control signals of the lower bridge arm switches V14, V15, and V16 respectively belonging to three phases, enabling the three switches V14, V15, and V16 to be closed or disconnected simultaneously. In the three-phase power converter 123, there is no phase difference between control signals of the upper bridge arm switches V21, V22, and V23 respectively belonging to three phases, which enables the three switches V21, V22, and V23 to be closed or disconnected simultaneously, and there is no phase difference between control signals of the lower bridge arm switches V24, V25, and V26 respectively belonging to three phases, which enables the three switches V24, V25, and V26 to be closed or disconnected simultaneously. Moreover, a square wave control signal may be advantageously taken to obtain a heating current effective value as large as possible.

At step 5: After the inductive charging is completed, the battery 121 may be charged. In some embodiments, under the control of the control module 117, the switches V24, V25, and V26 of the lower bridge arms of the three-phase power converter 123 may be disconnected and the switches V21, V22, and V23 of the upper bridge arms of the three-phase power converter 123 are then closed to charge the battery 121 through the inductor of the motor 112 and the inductor of the motor 122. In this case, a current path is: the positive electrode of the battery 111→the upper bridge arms V11, V12, and V13 of the three-phase power converter 113→the inductor of the winding of the motor 112→the inductor of the winding of the motor 122→the lower bridge arms V21, V22, and V23 of the three-phase power converter 123→a positive electrode of the battery 121→a negative electrode of the battery 121→the negative electrode of the battery 111.

At step 6: The step 4 and the step 5 may be repeated under the control of the control module 117, i.e., the battery 121 is charged multiple times by using the battery 111 until a predetermined condition is satisfied. As a non-limiting example, the predetermined condition may be a predetermined number of charging. As a non-limiting example, the predetermined condition may be a threshold temperature of the battery 121. In this case, the control module 117 may obtain a temperature of the battery 121 and determine whether the temperature is higher than the threshold temperature. When the temperature is lower than or equal to the threshold temperature, the step 4 and step 5 are performed again to quickly charge the battery 121 by using the battery 111. In this way, it may be ensured that the battery is heated to a desired threshold temperature, enabling the battery to operate normally.

In the present disclosure, as a non-limiting example, the threshold temperature may be a predetermined lower temperature limit that the battery may operate normally. For example, for a lithium-ion battery, the threshold temperature may be 0° C. or higher. As a non-limiting example, the threshold temperature may be a temperature value set by a user.

At step 7: After charging the battery 121, the inductor of the motor 112 and the inductor of the motor 122 may be charged by using electricity discharged from the battery 121. In some embodiments, after quick charging of the battery 121 is completed, under the control of the control module 117, the switches V11, V12, and V13 of the upper bridge arms of the three-phase power converter 113 may be disconnected, and the switches V14, V15, and V16 of the lower bridge arms of the three-phase power converter 113 may be closed; and the switches V21, V22, and V23 of the upper bridge arms of the three-phase power converter 123 may be closed, and the switches V24, V25, and V26 of the lower bridge arms of the three-phase power converter 123 may be disconnected, to perform inductive charging on the winding of the motor 112 and the winding of the motor 122 by using the electricity discharged from the battery 121. In this case, a current path is: a positive electrode of the battery 121→upper bridge arms V21, V22, and V23 of the three-phase power converter 123→the inductor of the winding of the motor 122→the inductor of the winding of the motor 112→lower bridge arms V14, V15, and V16 of the three-phase power converter 113→a negative electrode of the battery 121.

At step 8: After the inductive charging is completed, the battery 111 may be charged. In some embodiments, under the control of the control module 117, the switches V14, V15, and V16 of the lower bridge arms of the three-phase power converter 113 may be disconnected, and the switches V11, V12, and V13 of the upper bridge arms of the three-phase power converter 113 are then closed, to charge the battery 111 through the inductor of the motor 112 and the inductor of the motor 122. In this case, a current path is: the positive electrode of the battery 121→the upper bridge arms V21, V22, and V23 of the three-phase power converter 123→the inductor of the winding of the motor 122→the inductor of the winding of the motor 112→the upper bridge arms V11, V12, and V13 of the three-phase power converter 113→the positive electrode of the battery 111→the negative electrode of the battery 111→the negative electrode of the battery 121.

At Step 9: The step 7 and the step 8 may be repeated under the control of the control module 117, i.e., the battery 121 is discharged multiple times by using the battery 111 until the predetermined condition is satisfied. As a non-limiting example, the predetermined condition may be a predetermined number of discharging. As a non-limiting example, the predetermined condition may be the threshold temperature of the battery 121. In this case, the control module 117 may obtain the temperature of the battery 121 and determine whether the temperature is higher than the threshold temperature. When the temperature is lower than or equal to the threshold temperature, step 7 and step 8 are performed again to quickly discharge the battery 121 by using the battery 111.

It should be understood that the battery heating step may only include the step 4 and step 5 of charging the battery 121 by using the battery 111, or may further include the step 7 and the step 8 of charging the battery 111 by using the battery 121 (i.e., discharging the battery 121). During the charging and discharging of the battery, the current flows through the battery and a large amount of heat is generated because of the joule heat effect of the internal resistance of the battery. In the present disclosure, on the one hand, due to extraction of a neutral point of an inductor of a motor winding and the control without the phase difference between the three-phases of the switches of the upper bridge arms of the three-phase power converter and the three-phases of the switches of the lower bridge arms of the three-phase power converter, the inductors of the motor winding are connected in parallel, thereby lowering equivalent impedance of the motor and greatly enhancing the current flowing through the battery; and on the other hand, the battery has the characteristic of large internal resistance at a low temperature. Therefore, through the battery heating step, self-heating of the battery may be rapidly performed.

At Step 10: The step 4, step 5, step 7, and step 8 may be repeated under the control of the control module 117, i.e., charge-discharge cycles are performed on the battery 121 multiple times by using the battery 111 until the predetermined condition is satisfied. As a non-limiting example, the predetermined condition may be the threshold temperature of the battery 121. In this case, the control module 117 may obtain the temperature of the battery 121 and determine whether the temperature is higher than the threshold temperature. When the temperature is lower than or equal to the threshold temperature, step 4, step 5, step 7, and step 8 are performed again to quickly charging and discharging the battery 121 by using the battery 111.

At Step 11: After the temperature of the battery 121 reaches the threshold temperature, the heating may be stopped. In some embodiments, the switch K116 and the switch K126 may be disconnected after the switches V11 to V16 of the three-phase power converter 113 and the switches V21 to V26 of the three-phase power converter 123 are disconnected under the control of the control module 117, to complete a self-heating process. In this way, after the battery heating step is ended, an electrical connection associated with the neutral point may be disconnected, and the control of the power converter associated with the battery heating is ended, thereby making the power-consuming device enter a conventional operation mode.

It should be understood that the steps described above may be optional rather than necessary.

In addition, although FIG. 1 shows that battery self-heating is performed between a single rescue vehicle power-consuming device 1 and a single rescued vehicle power-consuming device 2 through charging and discharging, the power-consuming device 1 and the power-consuming device 2 may each include a plurality of rescued vehicles, i.e., a plurality of power-consuming devices 2 may be connected in parallel to a plurality of rescue vehicle power-consuming devices 1, and a plurality of power-consuming devices 1 may perform charging and discharging on the battery together with the plurality of power-consuming devices 2.

A method for heating a battery by means of a charging pile between two power-consuming devices is described below in conjunction with FIG. 2.

At Step 1: A charging gun 231 and a charging gun 232 of the charging pile are engaged to a charging socket 118 of a power-consuming device 1 and a charging socket 128 of a power-consuming device 2, respectively. The power-consuming device 1 and the power-consuming device 2 may be engaged to the charging pile. Therefore, the control module 210 may obtain a parameter of at least one of a battery 111 and a battery 112, and the parameter includes, but is not limited to, one or more of a temperature of a battery pack, a SOC, a voltage signal, or the like.

At Step 2: The control module 210 may determine, based on the parameter of the at least one of the battery 111 and the battery 112, whether the parameter satisfies a self-heating condition. As a non-limiting example, the self-heating condition may include whether the temperature of the battery pack being lower than a predetermined temperature, whether the SOC being higher than a predetermined SOC, whether a voltage amplitude being higher than a predetermined voltage amplitude, or the like. In response to the parameter satisfying the self-heating condition, the self-heating mode may be started. As illustrated in FIG. 2, a switch K231 and a switch K232 may be closed under the control of the control module 210, to couple the power-consuming device 1 with the power-consuming device 2 to perform self-heating of the battery. In response to the parameter not satisfying the self-heating condition, the step 12 may be performed to perform charging.

At Step 3: Before the battery heating step, pre-charging may be performed based on a pre-charge circuit. A specific process is described in the previous section and may not be described in detail herein.

At Step 4: An inductor of a motor 112 and an inductor of a motor 122 may be charged by using electricity discharged from the battery 111. For detailed process, reference may be made to the above description, and details thereof will be omitted herein.

At Step 5: After the charging of the inductor is completed, the battery 121 may be charged. For detailed process, reference may be made to the above description, and details thereof will be omitted herein.

At Step 6: The step 4 and step 5 may be repeated under the control of the control module 117. For the detailed process, reference may be made to the above description, and details thereof will be omitted herein.

At Step 7: After charging the battery 121, the inductor of the motor 112 and the inductor of the motor 122 may be charged by using the electricity discharged from the battery 121. For the detailed process, reference may be made to the above description, and details thereof will be omitted herein.

At Step 8: After the charging of the inductor is completed, the battery 111 may be charged. For the detailed process, reference may be made to the above description, and details thereof will be omitted herein.

At Step 9: The step 7 and step 8 may be repeated under the control of the control module 117. For the detailed process, reference may be made to the above description, and details thereof will be omitted herein.

At Step 10: The step 4, step 5, step 7, and step 8 may be repeated under the control of the control module 117 until the predetermined condition is satisfied. As a non-limiting example, the predetermined condition may be a threshold temperature of the at least one of the battery 111 and the battery 112. In this case, the control module 117 may obtain the temperature of the at least one of the battery 111 and the battery 112, and determine whether the temperature is higher than the threshold temperature. When the temperature is lower than or equal to the threshold temperature, the step 4, step 5, step 7, and step 8 are performed again to quickly perform charging and discharging of the battery 111 and the battery 112.

At Step 11: After the temperature of the at least one of the battery 111 and the battery 112 reaches the threshold temperature, the heating may be stopped. In some embodiments, after the switches V11 to V16 of the three-phase power converter 113 and the switches V21 to V26 of the three-phase power converter 123 are disconnected under the control of the control module 117, the switch K116 and the switch K126 are disconnected to complete the self-heating process. In this way, after the battery heating step is ended, an electrical connection associated with the neutral point may be disconnected, and control of the power converter associated with the battery heating is ended. Therefore, the power-consuming device may enter the conventional operation mode.

At Step 12: After the self-heating process is completed, a charging mode may be started. As illustrated in FIG. 2, the switches K117, K118, K211, and K212 may be closed to charge the battery 111 by using the power module 210 of the charging pile. At this time, a current path is: a positive terminal of the power module 210→a positive electrode of the battery 111→a negative electrode of the battery 111→a negative terminal of the power module 210. Similarly, the switches K127, K128, K221, and K222 may be closed to charge the battery 121 by using the power module 210 of the charging pile. In this way, after the self-heating process is completed, the power-consuming device may enter a conventional operation mode of being charged by using the charging pile.

At Step 13: After the charging process is completed, a standby mode after charging is completed may be entered. As illustrated in FIG. 2, switches K117, K118, K211, and K212 may be disconnected to end the charging of the battery 111; and switches K127, K128, K221, and K222 may be disconnected to end the charging of the battery 121.

It should be understood that the steps described above may be optional rather than necessary.

In addition, although FIG. 2 shows that battery self-heating is performed between a single power-consuming device 1 and a single power-consuming device 2 through the charging pile, the system 200 may include more power-consuming devices to perform charging and discharging of the battery together.

According to some embodiments of the present disclosure, as illustrated in FIG. 1, the present disclosure provides a device for heating a battery. The device is provided on a power-consuming device 1 and includes: an interface 116 that is electrically coupled to a neutral point of a motor winding of the power-consuming device 1 and is engageable with an interface 126 electrically coupled to a neutral point of a motor winding of the power-consuming device 2; an interface 115 that is electrically coupled to a negative electrode of a battery 111 of the power-consuming device 1 and is engageable with a interface 125 electrically coupled to a negative electrode of a battery of the power-consuming device 2; and a control module 117 that is coupled to a control system of the power-consuming device 1 and a control system of the power-consuming device 2 to coordinate and control the power-consuming device 1 and the power-consuming device 2 and is configured to perform a battery heating step. The battery heating step may include a step of charging the battery 112 by using the battery 111 and a step of charging the battery 111 by using the battery 112. The device may further include a switch K116. Moreover, the control module 117 determines whether a self-heating condition is satisfied before performing the battery heating step and closes the switch K116 in response to satisfying the self-heating condition. The device may further include a pre-charge circuit 114, and the control module 117 pre-charges a capacitor by using the pre-charge circuit 114 before performing the battery heating step.

According to some embodiments of the present disclosure, as illustrated in FIG. 2, the present disclosure provides a device for heating a battery. The device is provided on a charging pile and includes: a switch K231 and a switch K232 that are coupled in series between a charging gun 231 and a charging gun 232 of the charging pile, in which the charging gun 231 is engageable with a charging socket 118 of a power-consuming device 1, the charging socket 118 is electrically coupled to a neutral point of a motor winding of the power-consuming device 1, the charging gun 232 is engageable with a charging socket 128 of a power-consuming device 2, and the charging socket 128 is electrically coupled to a neutral point of a motor winding of the power-consuming device 2; and a control module 220 that is coupled to a control system of the power-consuming device 1 and a control system of the power-consuming device 2, to coordinate and control the power-consuming device 1, the power-consuming device 2, and the charging pile and is configured perform a battery heating step.

The battery heating step may include a step of charging the battery 112 of the power-consuming device 2 by using the battery 111 of the power-consuming device 1 and a step of charging the battery 111 by using the battery 112. The power-consuming device 1 may further include a switch K116. The power-consuming device 2 may further include a switch K126. Moreover, the control module 220 determines whether a self-heating condition is satisfied before performing the battery heating step, and closes the switch K116 and the switch K126 in response to satisfying the self-heating condition. The power-consuming device 1 may further include a pre-charge circuit 114, the power-consuming device 2 may further include a pre-charge circuit 124, and the control module 220 pre-charges the capacitor by using the pre-charge circuit 114 and the pre-charge circuit 124 before performing the battery heating step. The device may further include switches K211, K212, K221, and K222. The control module 220 determines whether a battery temperature of the power-consuming device 1 and a battery temperature of the power-consuming device 2 satisfy a predetermined condition. In response to the battery temperature satisfying the predetermined condition, the switches of the three-phase power converter and the switches K116 and K126 are disconnected, and the switches K211, K212, K221, and K222 are closed, to charge the power-consuming device 1 and the power-consuming device 2 by using a charging pile power module 210 through the charging pile. The power-consuming device 1 may further include a switch K117 and a switch K118, and the power-consuming device 2 may further include a switch K127 and a switch K128. Moreover, the control module 220 disconnects the switches K117, K118, K127, and K128 in response to the battery temperature not satisfying the self-heating condition, and closes the switches K117, K118, K127, and K128 in a case where the power-consuming device 1 and the power-consuming device 2 are charged through the charging pile.

According to some embodiments of the present disclosure, as illustrated in FIG. 3, the present disclosure provides a method for heating a battery. The method is performed at a power-consuming device or a charging pile and includes: engaging an interface electrically coupled to a negative electrode of a battery of a power-consuming device 1 with a third interface electrically coupled to a negative electrode of a battery of a power-consuming device 2; engaging a second interface electrically coupled to a neutral point of a three-phase motor winding of the power-consuming device 1 with a fourth interface electrically coupled to a neutral point of a three-phase motor winding of the power-consuming device 2; and performing a battery heating step, to charge a battery of the power-consuming device 2 by using a battery of the power-consuming device 1 and to charge the battery of the power-consuming device 1 by using the battery of the power-consuming device 2. The method further includes: pre-charging the capacitor before performing the battery heating step; determining whether a battery temperature of the power-consuming device 1 and a battery temperature of the power-consuming device 2 satisfy a predetermined condition; and determining whether a parameter of the power-consuming device 1 and a parameter of the power-consuming device 2 satisfy a self-heating condition.

It should be understood that FIG. 1 illustrates that the power-consuming device 1 is a rescue vehicle and the power-consuming device 2 is a rescued vehicle, but the present disclosure is not limited thereto. The present disclosure may be applied in a case where the power-consuming device 1 is the rescued vehicle, and the power-consuming device 2 is the rescue vehicle, or in a case where both the power-consuming device 1 and the power-consuming device 2 are normal vehicles.

It should be understood that a case of the motor and the three-phase power converter is illustrated in FIG. 1, but the present disclosure is not limited thereto. The present disclosure may be applied in other multi-phase motors and corresponding power converters, such as a six-phase motor and its corresponding power converter, a nine-phase motor and its corresponding power converter, and the like.

In the present disclosure, the power-consuming device is connected to the power-consuming device through coupling of neutral points connected by multiphases of motors, thereby reducing a current of each phase of inductor by means of the parallel shunt of a multi-phase motor winding inductor. Moreover, the total current flowing through the battery may be improved on the basis of a relatively limited value of each phase of inductor of a motor and a current range of a switch of the power converter, thereby improving Joule heat power and realizing rapid heating. The switch of the power converter may be controlled by using a square wave signal without a phase difference between three phases. Compared with a conventional scheme that adopts a high-frequency triangular wave or pulse width modulation (PWM) wave as a control signal, the control method is simple, and an effective value of a heating current is greatly improved. Therefore, according to the technical solutions of the present disclosure, it is possible to effectively improve the heating efficiency without replacing a switching device with a switching device having a greater current-carrying capability, and quickly solve the problem of battery heating at a low temperature. Moreover, according to the device and the method of the present disclosure, adverse effects on the motor are avoided, and the noise and vibration of the motor are lowered. In addition, according to the present disclosure, the device and method do not require extensive modification on the existing devices. Only a few switches need to be added to easily implement the device and method in an architecture of existing power-consuming device and an architecture of charging pile.

While the present disclosure has been described with reference to preferred embodiments, various modifications may be made and equivalents may be substituted for components thereof without departing from the scope of the present disclosure. In particular, the technical features mentioned in the various embodiments can be combined in any manner as long as there is no structural conflict. The present disclosure is not limited to the particular embodiments disclosed herein, and includes all embodiments falling within the scope of the claims.

What is claimed is:

1. A device for heating a battery, the device being provided on a first power-consuming device and comprising:
    a first interface electrically coupled to a neutral point of a motor winding of the first power-consuming device;
    a second interface electrically coupled to a negative electrode of a battery of the first power-consuming device; and
    a control module coupled to a control system of the first power-consuming device and a control system of a second power-consuming device to coordinate and control the first power-consuming device and the second power-consuming device,
    wherein:
    the first interface is engageable with a third interface electrically coupled to a neutral point of a motor winding of the second power-consuming device;
    the second interface is engageable with a fourth interface electrically coupled to a negative electrode of a battery of the second power-consuming device; and
    the control module is configured to control a battery heating step,
    wherein the control module is further configured, prior to the battery heating step, to obtain a temperature of the battery of at least one of the first power-consuming device and the second power-consuming device and determine whether the temperature is lower than or equal to a threshold temperature, and in response to the temperature being lower than or equal to the threshold temperature, control to at least charge the battery of the second power-consuming device by using the battery of the first power-consuming device or charge the battery of the first power-consuming device by using the battery of the second power-consuming device repetitively until the temperature satisfies a predetermined condition.

2. The device according to claim 1, wherein said charging the battery of the second power-consuming device by using the battery of the first power-consuming device comprises:
    closing a switch of an upper bridge arm of a three-phase power converter of the first power-consuming device and disconnecting a switch of a lower bridge arm of the three-phase power converter of the first power-consuming device, and disconnecting a switch of an upper bridge arm of a three-phase power converter of the second power-consuming device and closing a switch of a lower bridge arm of the three-phase power converter of the second power-consuming device, to perform inductive charging on the motor winding of the first power-consuming device and the motor winding of the second power-consuming device by using electricity discharged from the battery of the first power-consuming device; and closing the switch of the upper bridge arm of the three-phase power converter of the second power-consuming device and disconnecting the switch of the lower bridge arm of the three-phase power converter of the second power-consuming device, to charge the battery of the second power-consuming device subsequent to the inductive charging.

3. The device according to claim 1, wherein said charging the battery of the first power-consuming device by using the battery of the second power-consuming device comprises:

disconnecting a switch of an upper bridge arm of a three-phase power converter of the first power-consuming device and closing a switch of a lower bridge arm of the three-phase power converter of the first power-consuming device, and closing a switch of an upper bridge arm of a three-phase power converter of the second power-consuming device and disconnecting a switch of a lower bridge arm of the three-phase power converter of the second power-consuming device, to perform inductive charging on the motor winding of the first power-consuming device and the motor winding of the second power-consuming device by using electricity discharged from the battery of the second power-consuming device; and closing the switch of the upper bridge arm of the three-phase power converter of the first power-consuming device and disconnecting the switch of the lower bridge arm of the three-phase power converter of the first power-consuming device, to charge the battery of the first power-consuming device subsequent to the inductive charging.

4. The device according to claim 1, further comprising a first switch coupled in series between the neutral point of the first power-consuming device and the first interface, wherein the control module is further configured to, prior to the battery heating step:

close the first switch and a second switch that is coupled in series between the neutral point of the second power-consuming device and the third interface in response to the parameter satisfying the self-heating condition.

5. The device according to claim 4, wherein each of the first power-consuming device and the second power-consuming device further comprises a pre-charge circuit, the pre-charge circuit comprises a third switch coupled in series between one of a positive electrode and the negative electrode of the battery and one terminal of a capacitor coupled in parallel with an input terminal of the three-phase power converter, a fourth switch coupled in series between another one of the positive electrode and the negative electrode of the battery and another terminal of the capacitor, and a fifth switch that is coupled in series to a resistor and is coupled in parallel to both terminals of the fourth switch with the resistor; and the control module is further configured to control a pre-charging step, prior to the battery heating step, and the pre-charging step comprises:

closing the third switch and the fifth switch to pre-charge the capacitor; and closing the fourth switch and disconnecting the fifth switch subsequent to completing pre-charging the capacitor.

6. The device according to claim 1, wherein the control module is further configured to:

subsequent to the temperature satisfying the predetermined condition, disconnect all switches of three-phase power converters of the first power-consuming device and the second power-consuming device, and disconnect the first switch and the second switch.

7. A device for heating a battery, the device being provided on a charging pile and comprising:

a first switch coupled in series between a first charging gun and a second charging gun of the charging pile, wherein the first charging gun is engageable with a first charging socket of a first power-consuming device, the first charging socket is electrically coupled to a neutral point of a motor winding of the first power-consuming device, the second charging gun is engageable with a second charging socket of a second power-consuming device, and the second charging socket is electrically coupled to a neutral point of a motor winding of the second power-consuming device; and a control module coupled to a control system of the first power-consuming device and a control system of the second power-consuming device, to coordinate and control the first power-consuming device, the second power-consuming device, and the charging pile, wherein:

the first switch is configured to be closed to electrically couple the neutral point of the motor winding of the first power-consuming device to the neutral point of the second power-consuming device electrically coupled to the motor winding of the second power-consuming device; and the control module is configured to control a battery heating step, wherein the control module is further configured, prior to the battery heating step, to obtain a temperature of the battery of at least one of the first power-consuming device and the second power-consuming device and determine whether the temperature is lower than or equal to a threshold temperature; and in response to the temperature being lower than or equal to the threshold temperature, control to at least charge the battery of the second power-consuming device by using the battery of the first power-consuming device or charge the battery of the first power-consuming device by using the battery of the second power-consuming device repetitively until the temperature satisfies a predetermined condition.

8. The device according to claim 7, wherein said charging the battery of the second power-consuming device by using the battery of the first power-consuming device comprises:

closing a switch of an upper bridge arm of a three-phase power converter of the first power-consuming device and disconnecting a switch of a lower bridge arm of the three-phase power converter of the first power-consuming device, and disconnecting a switch of an upper bridge arm of a three-phase power converter of the second power-consuming device and closing a switch of a lower bridge arm of the three-phase power converter of the second power-consuming device, to perform inductive charging on the motor winding of the first power-consuming device and the motor winding of the second power-consuming device by using electricity discharged from the battery of the first power-consuming device; and closing the switch of the upper bridge arm of the three-phase power converter of the second power-consuming device and disconnecting the switch of the lower bridge arm of the three-phase power converter of the second power-consuming device, to charge the battery of the second power-consuming device subsequent to the inductive charging.

9. The device according to claim 7, wherein said charging the battery of the first power-consuming device by using the battery of the second power-consuming device comprises:

disconnecting a switch of an upper bridge arm of a three-phase power converter of the first power-consuming device and closing a switch of a lower bridge arm of the three-phase power converter of the first power-consuming device, and closing a switch of an upper bridge arm of a three-phase power converter of the second power-consuming device and disconnecting a switch of a lower bridge arm of the three-phase power converter of the second power-consuming device, to perform inductive charging on the motor winding of the first power-consuming device and the motor winding of the second power-consuming device by using electricity discharged from the battery of the second power-consuming device; and closing the switch of the upper bridge arm of the three-phase power converter of the first power-consuming device and disconnecting the switch of the lower bridge arm of the three-phase power converter of the first power-consuming device, to charge the battery of the first power-consuming device subsequent to the inductive charging.

10. The device according to claim 7, wherein the first power-consuming device further comprises a second switch coupled in series between the neutral point of the first power-consuming device and the first charging socket;

the second power-consuming device further comprises a third switch coupled in series between the neutral point of the second power-consuming device and the second charging socket; and the control module is further configured to, prior to the battery heating step:
close the second switch and the third switch in response to the parameter satisfying the self-heating condition.

11. The device according to claim 10, wherein each of the first power-consuming device and the second power-consuming device further comprises a pre-charge circuit, the pre-charge circuit comprises a fourth switch coupled in series between one of a positive electrode and a negative electrode of the battery and one terminal of a capacitor coupled in parallel with an input terminal of the three-phase power converter, a fifth switch coupled in series between another one of the positive electrode and the negative electrode of the battery and another terminal of the capacitor, and a sixth switch that is coupled in series with a resistor and is coupled in parallel to both terminals of the fifth switch with the resistor; and the control module is further configured to control a pre-charging step, prior to the battery heating step, and the pre-charging step comprises:
closing the fourth switch and the sixth switch to pre-charge the capacitor; and
closing the fifth switch and disconnecting the sixth switch subsequent to completing pre-charging the capacitor.

12. The device according to claim 7, wherein the charging pile further comprises a seventh switch coupled in series between the first charging gun and a power module of the charging pile and an eighth switch coupled in series between the second charging gun and the power module of the charging pile; and the control module is further configured to:
in response to the temperature being lower than or equal to the threshold temperature, disconnect all switches of three-phase power converters of the first power-consuming device and the second power-consuming device, and disconnect the second switch and the third switch; and
close at least one of the seventh switch and the eighth switch to charge the at least one of the first power-consuming device and the second power-consuming device.

13. The device according to claim 7, further comprising a ninth switch coupled in series between the first charging gun and the second charging gun of the charging pile to electrically couple a negative electrode of the battery of the first power-consuming device to a negative electrode of the battery of the second power-consuming device, wherein the first charging gun is further engageable with the first charging socket to be electrically coupled to the negative electrode of the battery of the first power-consuming device;

the second charging gun is further engageable with the second charging socket to be electrically coupled to the negative electrode of the battery of the second power-consuming device; and the control module is further configured to close the ninth switch in response to closing the first switch and disconnect the ninth switch in response to disconnecting the first switch.

14. The device according to claim 12, wherein the first power-consuming device further comprises a tenth switch coupling the battery of the first power-consuming device to the first charging socket in parallel;

the second power-consuming device further comprises an eleventh switch coupling a positive electrode of the battery of the second power-consuming device to the second charging socket in parallel; and the control module is further configured to:
disconnect the tenth switch and the eleventh switch in response to the parameter satisfying the self-heating condition; and
close a corresponding switch of the tenth switch and the eleventh switch in response to charging the at least one of the first power-consuming device and the second power-consuming device by using the charging pile.

* * * * *